United States Patent
Woodcock

(10) Patent No.: US 9,879,816 B2
(45) Date of Patent: Jan. 30, 2018

(54) LEVELLING UNIT FOR CAMERAS OR SENSORS

(71) Applicants: ZipperMast, Inc., Titusville, FL (US); progenoX GmbH, Bischofswiesen (DE)

(72) Inventor: Frank Woodcock, Berchtesgaden (DE)

(73) Assignees: ZIPPERMAST, INC., Titusville, FL (US); PROGENOX GMBH, Bischofswiesen (DE)

( * ) Notice: Subject to any disclaimer, the term of this patent is extended or adjusted under 35 U.S.C. 154(b) by 0 days.

(21) Appl. No.: 15/157,537

(22) Filed: May 18, 2016

(65) Prior Publication Data

US 2016/0341353 A1 Nov. 24, 2016

(30) Foreign Application Priority Data

May 18, 2015 (DE) .................. 10 2015 006 437

(51) Int. Cl.
| | |
|---|---|
| *F16M 13/00* | (2006.01) |
| *F16M 11/20* | (2006.01) |
| *G03B 17/56* | (2006.01) |
| *F16H 1/20* | (2006.01) |
| *F16M 11/12* | (2006.01) |
| *F16M 11/18* | (2006.01) |

(52) U.S. Cl.
CPC ......... *F16M 11/2007* (2013.01); *F16H 1/203* (2013.01); *F16M 11/126* (2013.01); *F16M 11/18* (2013.01); *G03B 17/561* (2013.01); *F16M 2200/041* (2013.01)

(58) Field of Classification Search
USPC ........................................................ 248/550
See application file for complete search history.

(56) References Cited

U.S. PATENT DOCUMENTS

| 4,575,039 A | 3/1986 | Persson et al. | |
|---|---|---|---|
| 4,709,265 A | * 11/1987 | Silverman | B62D 1/28 |
| | | | 348/158 |

(Continued)

FOREIGN PATENT DOCUMENTS

WO WO2011020470 2/2011

*Primary Examiner* — Monica Millner
(74) *Attorney, Agent, or Firm* — Mannava & Kang, P.C.; Eliot R. Malamud

(57) ABSTRACT

The present invention relates to a levelling unit for cameras or sensors, comprising a base, a tilting table that is tiltable with respect to the base, and two wedge rings arranged between said base and said tilting table, each wedge ring having two end faces oriented to one another in a wedge-like manner. Said tilting table is connected to said base via a cardan joint such that a relative rotation of said tilting table with respect to said base is prevented. Said two wedge rings are formed by a first wedge ring rotatably supported on said base and by a second wedge ring rotatably supported on said tilting table, wherein said second wedge ring is also rotatable with respect to said first wedge ring. A first drive is provided for said first wedge ring and a second drive is provided for said second wedge ring. According to the invention it is provided that said first drive is attached to said base and said second drive is attached to said tilting table, wherein no drive acting between said first wedge ring and said second wedge ring is provided.

9 Claims, 4 Drawing Sheets

(56) References Cited

U.S. PATENT DOCUMENTS

Figure 1:
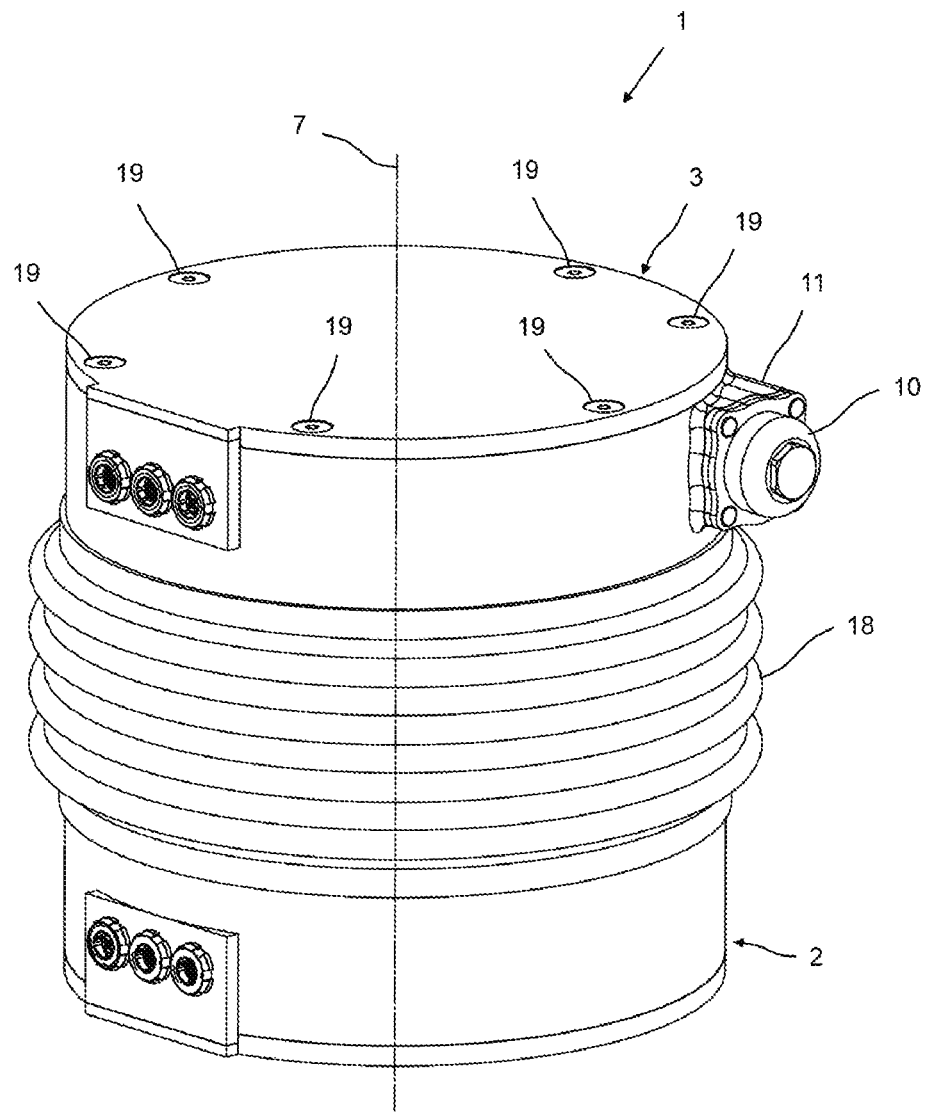

| | | | | |
|---|---|---|---|---|
| 4,819,002 A * | 4/1989 | Reboullet | ................ | B23Q 1/54 |
| | | | | 248/179.1 |
| 5,573,218 A * | 11/1996 | Vaassen | ................... | H01Q 3/08 |
| | | | | 248/371 |
| 5,860,327 A | 1/1999 | Stanev | | |
| 7,520,483 B2 * | 4/2009 | Rand | .................... | F16M 11/126 |
| | | | | 248/346.06 |
| 7,658,556 B2 * | 2/2010 | Johnson | ................ | F16M 11/02 |
| | | | | 248/177.1 |
| 8,075,201 B2 * | 12/2011 | Strong | ................... | G03B 17/04 |
| | | | | 396/342 |
| 8,141,452 B2 * | 3/2012 | Wood | .................. | B23Q 1/5406 |
| | | | | 248/179.1 |
| 8,151,660 B2 * | 4/2012 | Wood | ...................... | B23Q 1/44 |
| | | | | 74/55 |
| 9,004,419 B2 * | 4/2015 | Nakatani | ............. | F16M 11/126 |
| | | | | 248/178.1 |
| 2012/0181400 A1 * | 7/2012 | Christof | .............. | F16M 11/105 |
| | | | | 248/222.52 |
| 2013/0229569 A1 * | 9/2013 | Bevirt | .................... | F16M 11/12 |
| | | | | 348/373 |

\* cited by examiner

LEVELLING UNIT FOR CAMERAS OR SENSORS

CLAIM FOR PRIORITY

The present application is claims priority to German patent application number 10 2015 006 437.1, having a filing date of May 18, 2015, the disclosures of which is hereby incorporated by reference in their entirety.

The present invention relates to a levelling unit for cameras or sensors according to the preamble of independent claim 1.

A levelling unit of the generic type comprises a base, a tilting table that is tiltable with respect to the base, and two wedge rings arranged between said base and said tilting table, each wedge ring having two end faces oriented to one another in a wedge-like manner. The tilting table is connected to said base via a cardan joint such that a relative rotation of said tilting table with respect to said base is prevented. Said two wedge rings are formed by a first wedge ring rotatably supported on said base and by a second wedge ring rotatably supported on said tilting table, wherein said second wedge ring is also rotatably supported with respect to said first wedge ring. A first drive is provided for said first wedge ring and a second drive is provided for said second wedge ring.

Cameras, sensors or similar devices are nowadays used on different systems. A number of applications require mobile platforms. Cameras for example are often installed on movable systems. In many cases, it is necessary to keep the platform to which the camera or sensor is installed oriented in a certain way. Often, an always horizontal orientation of the platform is necessary. Mobile systems such as terrestrial vehicles, ships, airplanes or the like are, to this end, equipped with a levelling unit, the base of which is fixedly connected to the respective system, and which comprises a tilting table that is tiltable with respect to the base and that can always be aligned horizontally regardless of the position or orientation of the base by means of a respective mechanism.

Several systems for orienting cameras or sensors are known from the state-of-the-art. For example, hexapods can be used for that purpose. These are devices with several cylinders between base and tilting table that are usually driven hydraulically. These systems are, however, relatively big, difficult to control and sensitive to dirt. As a rule, they cannot be used underwater and they cannot be exposed to large temperature changes.

On board of ships, gimbals are used for horizontal alignment of several devices, for example in the galley. These devices, however, do not offer a stable platform for cameras or sensors.

Furthermore, so-called pan-tilt units are also known from the prior art. As a rule, these are relatively expensive.

A levelling unit according to the preamble of independent claim 1 is for example known from U.S. Pat. No. 4,575,039. The levelling unit is used for aligning a radar antenna of a ship. In addition to the two wedge rings that are rotatable relative to each other, this levelling unit comprises a so-called intermediate ring rotatably mounted in the first wedge ring and being in engagement with a toothing of its upper end face with a corresponding opposing toothing of the second wedge ring. The construction of this levelling unit is relatively complex. In addition, the possible tilt angle that the tilting table can have with respect to the base is relatively limited.

Another levelling unit according to the preamble of independent claim 1 designed for use as a sensor platform in airplanes is known from WO 2011/020470 A1. This device comprises a support structure and three motor-driven rings, wherein the last one of the three rings is adapted to receive the sensor. All three rings can have their own drive. Alternatively, the drive of the last ring serving to receive the sensor can be omitted if there is provided a mechanical polarization compensation. This can be made by means of a cardan joint fixed to the support structure.

Another levelling unit with two wedge rings that are rotatable relative to each other is known from U.S. Pat. No. 5,860,327.

It is the object of the present invention to provide a levelling unit of the generic kind that is robust and, at the same time, has a simple design and can be manufactured economically.

The object is accomplished by the features of independent claim 1. According to that, a solution to the problem according to the invention is given with a levelling unit of the generic type if the first drive is attached to the base and the second drive is attached to the tilting table, wherein no drive acting between the first wedge ring and the second wedge ring is provided. As a result of the base being connected to the tilting table via a cardan joint and the only two drives of the levelling unit being fixedly connected to these two parts, the two wedge rings can be rotated against each other in any desired way without any sliding contacts or the like being necessary for contacting the drives and or a device attached to the tilting table. The constructional design is, therefore, particularly simple and allows an also simple assembly of the levelling unit according to the invention.

Preferred embodiments of the present invention are the subject of the sub-claims.

In a particularly preferred embodiment of the present invention, it is provided that an assembly comprising said base and said first drive is identical to an assembly comprising said tilting table and said second drive. This applies to the constructional design as well as to the geometric dimensions such that the two assemblies are essentially identical in construction. This embodiment allows a particularly cost-efficient production of the levelling unit according to the invention. Further preferably, the second wedge ring is essentially identical to the first wedge ring. The levelling unit can, thus, be put together using two identical assemblies, each consisting of a base, a wedge ring rotatably mounted thereto, and a drive for the wedge ring attached to the base.

In another preferred embodiment of the present invention, it is provided that said first drive is at least partially received in an interior space of said base, wherein said second drive is at least partially received in an interior space of said tilting table. Thereby, a robust construction of the levelling unit according to the invention is achieved.

Furthermore, it is advantageous if said first drive and said second drive each comprise an electric motor and a gear unit attached thereto, wherein said gear unit is arranged within the interior space of said base and said tilting table respectively. Preferably, said base and said tilting table each have a flange connected to said gear unit and adapted to receive said electric motor. With this embodiment, the corresponding electric motors can be replaced in a simple manner if required. The flange is preferably positioned at an outer side of base or tilting table respectively such that the electric motor can always be replaced in a simple and fast manner.

Particularly preferably, the flange is positioned at an outer circumference of the base or tilting table respectively.

In a further preferred embodiment of the present invention, it is provided that said drives each comprise an output shaft with a gear wheel, wherein said gear wheel meshes with a toothing of the respective driven wedge ring. This embodiment also ensures a structure that is simple in design and robust. In order to allow transmission of particularly high torques, the toothing is preferably an internal toothing of the respective wedge ring, coaxially aligned with the axis of the respective wedge ring. The internal toothing can be positioned relatively far toward the outside in the radial direction, whereby torque transmission is supported. It is to be noted that the respective wedge ring can be a multi-piece construction. Thus, it is possible that the toothing is located on an annular gear that is manufactured separately.

In another preferred embodiment of the present invention, it is provided that said output shaft is arranged at an angle with respect to an input shaft of the gear unit, wherein said angle is preferably 90°. With this embodiment, the major part of the gear unit can be accommodated within the base or the tilting table respectively in a space saving manner. Thereby, the levelling unit as a whole can be kept very compact. The output shaft of the gear box is preferably aligned parallel to the axis of base or tilting table respectively. Said axis can preferably be the symmetry axis of the base or tilting table respectively. Bevel gears are preferably used for a change in direction. Further preferably, the gear unit comprises a reduction gear. Thus, relatively weak and inexpensive electric motors can be used. Particularly preferred, it is provided that the reduction gear is a planetary gear. The main axis of the planetary gear is preferably parallel to the main extension of the base or tilting table respectively.

In another particularly preferred embodiment of the present invention, it is provided that said base and said tilting table are connected to one another via a folding bellows enclosing said first wedge ring and said second wedge ring. This embodiment ensures a construction that is very robust and insensitive to moisture and dirt. In case an appropriate sealing is provided between the folding bellows and the base or the tilting table respectively, the levelling unit according to the invention can thus also be used underwater. With this embodiment, it is particularly advantageous if said first wedge ring and said second wedge ring have a smaller outer circumference than said base and said tilting table, wherein said wedge rings do not project beyond the outer circumference of said base and said tilting table at least in a neutral position of said tilting table in which said tilting table is not tilted with respect to said base. This allows a simple assembly of the folding bellows and, at the same time, ensures a long service life due to minimal wear of the folding bellows.

In another particularly preferred embodiment of the present invention, it is provided that a first position sensor is attached to said base, wherein said levelling unit comprises a control automatically adjusting said tilting table based on a signal of said first position sensor.

The control is preferably programmed such that it calculates the orientation of the tilting table based on the signal of the first position sensor and based on the rotation angle of the first and second wedge rings. With this embodiment, it is not necessary that the tilting table is also equipped with a position sensor because its orientation or position is determined only by calculation. For detecting the relative rotation between the wedge rings, appropriate sensors must be provided.

Further preferably, the control is implemented such that the tilting table is always kept in a horizontal position. A second position sensor can of course be attached to the tilting table for detecting the orientation of the tilting table.

The axis of the base is, in the neutral position of the tilting table, preferably congruent with the axis of the tilting table. This ensures a simple construction and a compact design.

Further preferably, the electric cabling of a device being attached or attachable to the tilting table, for example a camera or a sensor, is arranged within the levelling unit. It can, for example, run within or along a cardan shaft extending between the base and the tilting table.

Further preferably, a first end face of the wedge ring defining a base surface of the wedge ring is aligned perpendicular to the axis of the respective wedge ring. The axis is, thereby, defined by the outer circumference of the wedge ring. With the first wedge ring, the base surface faces the base, with the second wedge ring, the base surface faces the tilting table. Further preferably, base and tilting table have end faces being aligned parallel to each other. It is also advantageous if the base and the tilting table have cylindrical circumferences respectively. In a neutral position of the tilting table, the levelling unit according to the invention has, thereby, an essentially cylindrical form. This ensures a compact design.

A preferred embodiment of the present invention will be explained in greater detail by means of drawings in the following.

Figure 2:
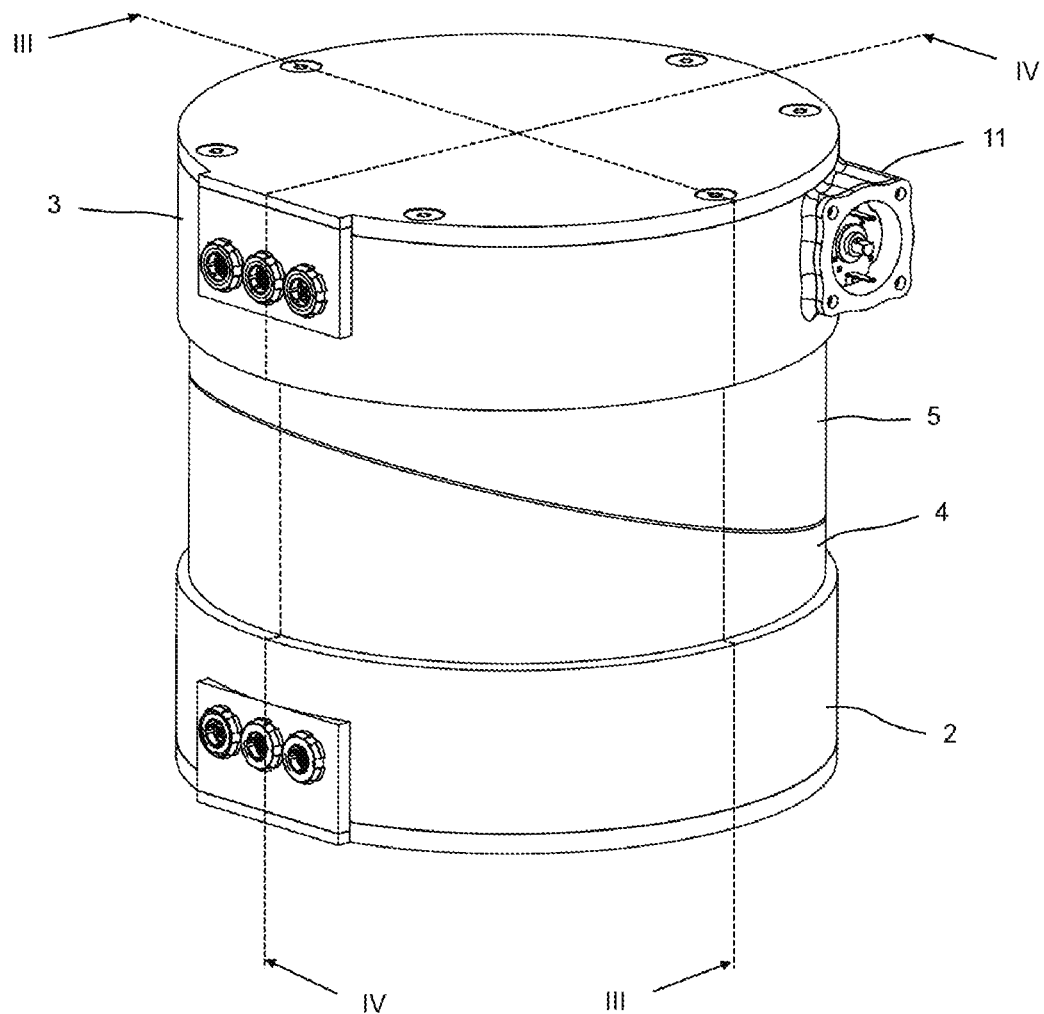
Figure 3:
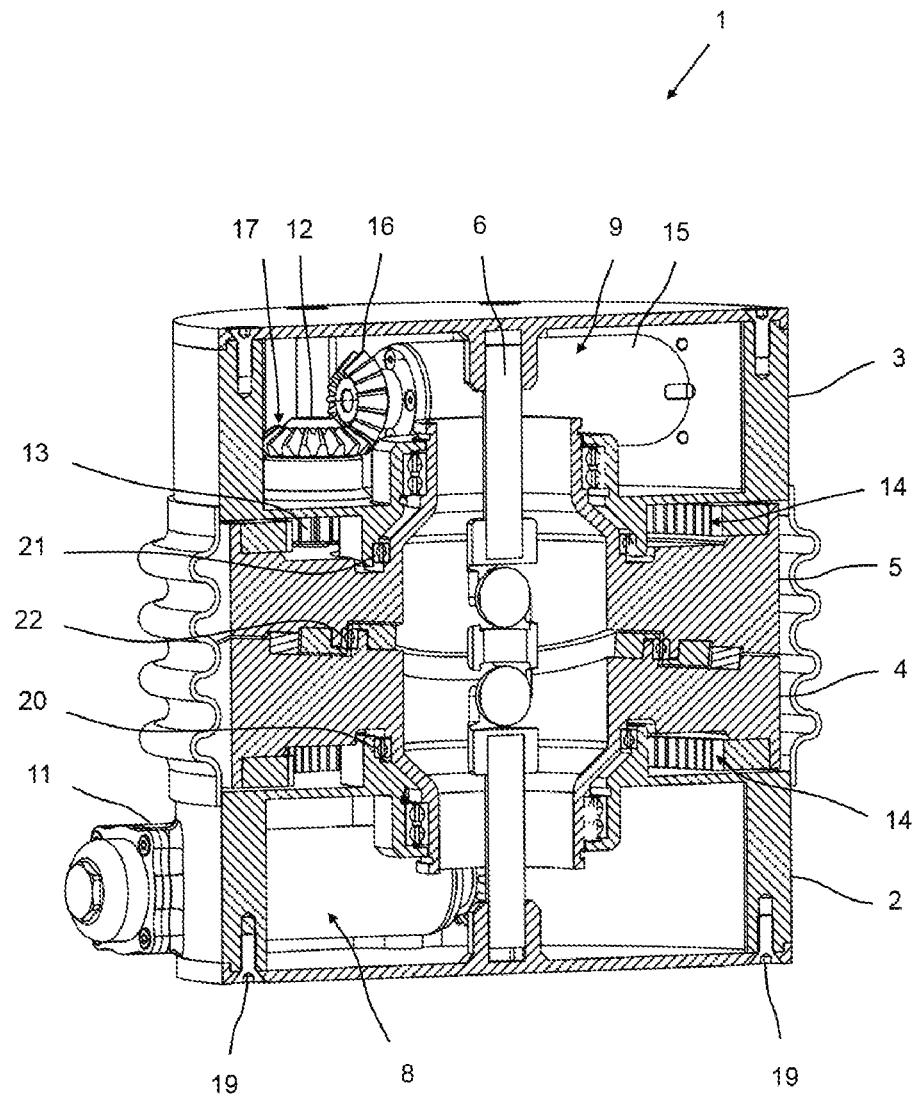
Figure 4:
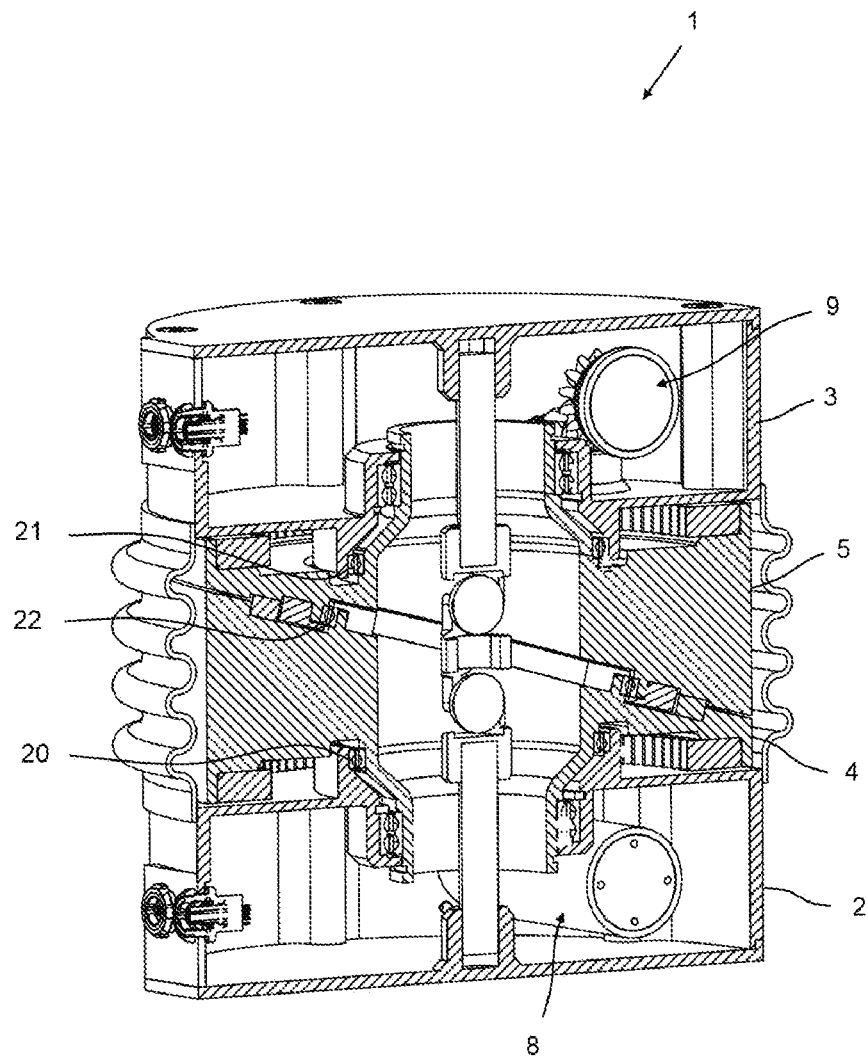

The drawings show:

FIG. 1 an embodiment of a levelling unit according to the invention in a perspective view, FIG. 2 the levelling unit according to the invention from FIG. 1 without folding bellows and electric motor, FIG. 3 a longitudinal section of the levelling unit according to the invention from FIGS. 1 and 2 along the intersection III marked in FIG. 2 in a perspective view, and FIG. 4 a longitudinal section of the levelling unit according to the invention from FIGS. 1 to 3 along the intersection IV marked in FIG. 2, also in a perspective view.

For the following embodiments, equal parts are designated with equal reference signs. If reference signs, which are not addressed any further in the pertaining description of Figures, are contained in a drawing, reference shall be made to preceding or following descriptions of Figures.

FIG. 1 shows a perspective view of a levelling unit 1 according to the invention. The levelling unit comprises a base 2 and a tilting table 3 which is tiltable with respect to the base 2. Both, the base 2 and the tilting table 3 have essentially a cylindrical form. In the neutral position of the tilting table 3 shown in FIG. 1, base and tilting table are aligned parallel to each other. In said neutral position, the axes of base 2 and tilting table 3 are congruent. Both axes coincide with the main axis 7 of the levelling unit marked in FIG. 1. FIG. 1 shows that the tilting table 3 has several fixing holes or threaded holes 19. These are used to affix a camera or a sensor to the tilting table 3. If necessary, a turning table can additionally be provided between the tilting table 3 and the camera or the sensor. The base 2 is also equipped with threaded holes 19. These are shown for example in FIG. 3.

Base 2 and tilting table 3 are connected to each other at the outer circumference via a folding bellows 18. The folding bellows encloses the mechanism provided for tilting the tilting table 3 with respect to the base 2. FIG. 2 shows the levelling unit according to the invention from FIG. 1 without the folding bellows 18. It is shown that two wedge rings 4 and 5 that are rotatable against each other are arranged between the base 2 and the tilting table 3. The bearings of both wedge rings are shown in more detail in the two longitudinal sections in FIGS. 3 and 4. The first wedge ring 4 is rotatably mounted with respect to the base 2 via a first ball bearing 20. The second wedge ring is rotatably mounted with respect to the tilting table 3 in the same manner via a second ball bearing 21. Additional bearings can be provided for an axial support. The two wedge rings 4 and 5 are also rotatably supported with respect to each other via a third ball bearing 22.

As shown in FIG. 3, the base 2 and the tilting table 3 are connected via a cardan shaft 6 extending along the main axis 7 shown in FIG. 1 such that a relative rotation of the tilting table 3 with respect to the base 2 is prevented. This ensures that an electric cabling of the sensor or camera can be run through the interior space of the levelling unit without any sliding contacts or the like being necessary for this purpose.

As it becomes apparent from the drawings, the lower half of the levelling unit is essentially identical to the upper half. This means that the tilting table 3 is essentially identical to the base 2. The wedge rings 4 and 5 are also identical in construction.

The angle between the tilting table 3 and the base 2 is adjusted by rotation of the two wedge rings 4 and 5 with respect to base 2 and tilting table 3 respectively. To this end, the two drives 8 and 9 are provided. They each comprise an electric motor and a gear box attached thereto. The gearbox is completely received in an interior space of the base 2 and the tilting table 3 respectively. As shown in FIG. 1, base 2 and tilting table 3 each comprise a flange 11 being disposed at the outer circumference of the respective part. The corresponding electric motor 10 of the drive is attached to the flange 11.

The gearbox essentially comprises a planetary gear 15, the main axis of which is aligned parallel to the main extension of the base 2 and the tilting table 3 respectively. The planetary gear is, thus, received in the interior space of the corresponding part in a space-saving manner. The bevel gear 16 of the planetary gear meshes with another bevel gear 17 of an output shaft 12 that is aligned perpendicular to the main axis of the planetary gear and parallel to the axis of the base 2 or the tilting table 3 respectively. The output shaft 12 is rotatably mounted within the interior of base 2 or tilting table 3 respectively. At an end lying opposite the bevel gear 17, the output shaft comprises a pinion 13 meshing with an internal toothing 14 of the corresponding wedge ring 4 or 5.

A position sensor which is not shown and which allows detection of the orientation of the base is attached to the base 2. The levelling unit comprises a control which is also not shown and which automatically adjusts the tilting table based on the signal of the position sensor. The actual orientation of the tilting table can, thereby, be calculated on the basis of the signal of the position sensor and on the basis of the relative rotation of the wedge rings with respect to base and tilting table respectively. The relative rotation of the wedge rings is detected by sensors that are also not shown. In addition to the position sensor of the base, also the tilting table can be equipped with a position sensor. This position sensor serves for detecting the orientation of the tilting table. It is, however, not absolutely necessary.

FIG. 3 shows that the diameter of the two wedge rings 4 and 5 is a little bit smaller than the outer circumference of base 2 and tilting table 3 respectively. Therefore, a sufficiently dimensioned gap exists between the folding bellows 18 and the two rotating wedge rings for preventing contact between the folding bellows and the two wedge rings in the shown neutral position of the tilting table. The levelling unit according to the invention is, thus, particularly robust and low in wear.

The invention claimed is:

1. A leveling unit for a device, the leveling unit comprising:
    a base;
    a tilting table that is tiltable with respect to the base: and
        two wedge rings arranged between said base and said tilting table, each of the two wedge rings have two end faces oriented to one another in a wedge-like manner,
        wherein said tilting table is connected to said base such that a relative rotation of said tilting table with respect to said base is prevented,
        wherein said two wedge rings are formed by a first wedge ring rotatably supported on said base and by a second wedge ring rotatably supported on said tilting table, and
        wherein said second wedge ring is rotatable with respect to said first wedge ring; and
    a first drive coupled to said first wedge ring and a second drive coupled to said second wedge ring,
        wherein said first drive is attached to said base and said second drive is attached to said tilting table;
        wherein said first drive is at least partially received in an interior space of said base, said second drive is at least partially received in an interior space of said tilting table;
        wherein said first drive comprises a first electric motor and a first gear unit attached thereto, said second drive comprises a second electric motor and a second gear unit attached thereto, wherein said first and second gear units are disposed within the interior space of said base and said tilting table, respectively; and
        wherein said base and said tilting table each have a flange connected to said first gear unit and said second gear unit to receive said first and second electric motors.

2. The levelling unit according to claim 1, comprising a first assembly that includes said base and said first drive, and a second assembly comprising said tilting table and said second drive.

3. The levelling unit according to claim 1, wherein each of said first drive and said second drive comprises an output shaft with a gear wheel, and wherein said gear wheel meshes with teeth of the respective driven wedge ring.

4. The levelling unit according to claim 3, wherein said output shaft is arranged at an angle of about 90° with respect to an input shaft of each of the first and second gear units.

5. The levelling unit according to claim 1, wherein in said base and said tilting table are connected to one another via a folding bellows enclosing said first wedge ring and said second wedge ring.

6. The levelling unit according to claim 5, wherein first wedge ring and said second wedge ring have a smaller outer circumference than said base and said tilting table, wherein said wedge rings do not project beyond the outer circumference of said base and said tilting table at least in a neutral position of said tilting table in which said tilting table is not tilted with respect to said base.

7. The levelling unit according to claim 1, wherein a first position sensor is attached to said base, wherein said levelling unit comprises a control to automatically adjust said tilting table based on a signal of said first position sensor.

8. The levelling unit according to claim 7, further comprising a second position sensor attached to said tilting table to detect an orientation of said tilting table.

9. The leveling unit according to claim 1, wherein the leveling unit does not include a drive acting between said first wedge ring and said second wedge ring.

* * * * *